United States Patent
Son et al.

(10) Patent No.: US 9,495,022 B2
(45) Date of Patent: Nov. 15, 2016

(54) COORDINATE COMPENSATION METHOD AND APPARATUS IN DIGITIZER, AND ELECTRONIC PEN USED IN THE SAME

(71) Applicant: Samsung Electronics Co., Ltd., Gyeonggi-do (KR)

(72) Inventors: Je-Hyun Son, Gyeonggi-do (KR); Young-Jae Ko, Gyeonggi-do (KR); Min-Seok Kim, Gyeonggi-do (KR); Sang-Ryul Park, Gyeonggi-do (KR); Ju-Gab Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 119 days.

(21) Appl. No.: 13/933,438

(22) Filed: Jul. 2, 2013

(65) Prior Publication Data

US 2014/0009416 A1  Jan. 9, 2014

(30) Foreign Application Priority Data

Jul. 3, 2012  (KR) .................... 10-2012-0072064

(51) Int. Cl.
*G06F 3/0354* (2013.01)
*G06F 3/041* (2006.01)
*G06F 3/046* (2006.01)

(52) U.S. Cl.
CPC ........... *G06F 3/03545* (2013.01); *G06F 3/046* (2013.01); *G06F 3/0416* (2013.01)

(58) Field of Classification Search
CPC ................ G06F 3/0354; G06F 3/03545; G06F 3/0416; G06F 3/046

USPC .................... 345/173–175; 178/19.03, 18.07
See application file for complete search history.

(56) References Cited

U.S. PATENT DOCUMENTS

| | | | |
|---|---|---|---|
| 4,477,877 A * | 10/1984 | Nakamura et al. | 702/95 |
| 4,931,965 A * | 6/1990 | Kaneko et al. | 345/174 |
| 4,939,318 A * | 7/1990 | Watson et al. | 178/18.02 |
| 5,751,229 A * | 5/1998 | Funahashi | 341/5 |
| 8,243,049 B2 * | 8/2012 | Vos | 345/179 |

(Continued)

FOREIGN PATENT DOCUMENTS

| KR | 10-2005-0099099 A | 10/2005 |
|---|---|---|
| KR | 10-2011-0012217 A | 2/2011 |
| KR | 10-2012-0012870 A | 2/2012 |

*Primary Examiner* — Chanh Nguyen
*Assistant Examiner* — Daniel Duong
(74) *Attorney, Agent, or Firm* — Cha & Reiter, LLC.

(57) ABSTRACT

A method and apparatus for detecting by a digitizer an application of an electronic pen on or within a predetermined distance from a screen of an electronic device, and includes compensating coordinates of an electronic pen relative to screen. At least one magnetic field is detected that is produced by the electronic pen and that has a different central axis each other The digitizer determines whether the electronic pen is inclined based on a number of detected magnetic fields. A determination is made whether to apply a compensation value for compensating coordinates of the electronic pen based on determining inclination of the electronic pen. The present invention advantageously permits exact recognition of coordinates of the electronic pen whether then pen is inclined or not by performing the coordinate compensation taking into account the inclination of the electronic pen and the inclined direction.

11 Claims, 8 Drawing Sheets

(56) References Cited

U.S. PATENT DOCUMENTS

| | | | |
|---|---|---|---|
| 2011/0282624 A1* | 11/2011 | Hsieh et al. | 702/154 |
| 2012/0327042 A1* | 12/2012 | Harley et al. | 345/179 |
| 2013/0009907 A1* | 1/2013 | Rosenberg et al. | 345/174 |
| 2013/0088465 A1* | 4/2013 | Geller | G06F 3/03545 |
| | | | 345/179 |

* cited by examiner

COORDINATE COMPENSATION METHOD AND APPARATUS IN DIGITIZER, AND ELECTRONIC PEN USED IN THE SAME

CROSS RELATED APPLICATION

This application claims the benefit of priority under 35 U.S.C. §119(a) from a Korean Patent Application field in the Korean Intellectual Property Office on Jul. 3, 2012, and assigned Serial No. 10-2012-0072064, the entire disclosure of which is incorporated herein by reference in its entirety.

BACKGROUND

1. Field of the Invention

The present disclosure relates generally to a coordinate recognition method and apparatus that can use an electronic pen. More particularly, the present invention to a method and apparatus for compensating coordinates of an electronic pen, particularly as when used in electronic devices touchscreens.

2. Description of the Related Art

A digitizer is a device often arranged in a computer for receiving coordinates from a user in lieu of a key board or a mouse, and has been widely used in all kinds of electronic devices, such as in smartphones and tablets, etc.

In a method of detecting coordinates input by the user in the digitizer, there has been a method of using a magnetic field. The conventional method is described with reference to FIG. 1.

The conventional method uses a digitizer 110 that includes a plurality of loop coils 112 arranged orthogonally to one another. The digitizer 110 repeatedly performs application of alternate current (AC) for producing magnetic fields and detection of a magnetic field generated by the electronic pen 120, while sequentially selecting the loop coils 112.

The electronic pen 120 inputs coordinates on the digitizer 110 includes an LC circuit 122 consisting of a coil and a capacitor. A current is induced in the coil from the magnetic field produced in the digitizer 110 and is passed to the capacitor. The capacitor is charged with the current from the coil, and the discharge current from the capacitor flows to the coil. Accordingly, a magnetic field is produced around the coil and is detected at the digitizer 110.

The coil within the electronic pen 120 is kept a distance from an end part (hereinafter, referred to as a "tip") of the electronic pen 120 that contacts the digitizer 110, and the distance, in case the coordinates are input with the electronic pen 120 being inclined, may cause an error between coordinates desired by the user and recognized by the digitizer 110.

With reference to FIG. 2, such a problem will be explained in more detail.

As shown in FIG. 2, when the user inputs coordinates in the digitizer 110 with the electronic pen 120 being inclined (which is the typical natural way to hold a pen and mark a paper, tablet, screen, etc.), an error occurs between coordinates X desired by the user and coordinates X' recognized by the digitizer 110, the error corresponding to a distance d. The reason for such an error as described above is because the coil 124 within the LC resonance circuit 122 is kept a distance away from the tip 126 of the electronic pen 120. In other words, since a magnetic field 130 produced around the coil 124 has a curved form that does not pass through the tip 126 of the electronic pen 120, the coordinates at which the magnetic field is detected in the digitizer are not the coordinates X that the user actually wants and has arranged the tip of the pen on, but the coordinates X' with the distance d from the coordinates X.

Meanwhile, to solve the problem of the error occurrence, as described above with reference to FIG. 2, there is a method of applying a set compensation value to the detected coordinates. The conventional method is described with reference to FIG. 3A.

Referring now to FIG. 3A, the digitizer 110 recognizes coordinate X resulting from application of the compensation value as much as the error "d" to the coordinate X' at which the magnetic field is detected. Thus, the coordinate X recognized by the digitizer 110 is the same as the coordinate X that the user actually wants to input. However, the method applies the compensation value without taking into account inclination of the electronic pen 120 and/or the inclined direction, a problem of which will be described in connection with FIGS. 3B and 3C, which have different inclinations than FIG. 3A.

FIG. 3B illustrates a case where the user inputs coordinates with the electronic pen 120 being essentially perpendicular to the digitizer 110. The coordinates X at which the magnetic field is detected in FIG. 3B are the same as the coordinate X that the user wants to input. However, according to the conventional method, even in this case, the coordinate X' to which the compensation value as much as the error d is applied are recognized as the input coordinates from the user. Thus, the error d exists between the coordinate X that the user wants to input and the coordinate X' recognized by the digitizer 110.

Further, as shown in FIG. 3C, in a case where the electronic pen 120 is inclined in the opposite direction to that of FIG. 3A (for example, a common angle by a left-handed person), the digitizer 110 recognizes the coordinate X" resulting from application of the compensation value as much as the error d to the coordinate X' at which the magnetic field is detected as the input coordinates from the user. Thus, the error 2d between the coordinates X that the user wants to input and the coordinates X" recognized by the digitizer 110 rather increases.

Thus, according to the conventional method in which a coordinate of an electronic pen is recognized, a problem arises that there is an error between coordinates that a user wants to input and coordinates recognized by a digitizer. Furthermore, according to the conventional method of compensating the coordinates of the electronic pen with a set compensation value, the error between the coordinates that a user wants to input and coordinates recognized by a digitizer increases depending on inclination of the electronic pen and inclined direction, meaning that the conventional method of compensation at times introduced additional error into the system.

SUMMARY

The present invention provides a method and apparatus providing more accurate coordinate recognition of by determining whether or not to perform coordinate compensation based on whether the electronic pen is inclined.

The present invention also provides a method and apparatus providing more accurate coordinate recognition by performing coordinate compensation that takes into account the inclination of an electronic pen used against or near a screen.

In accordance with an exemplary aspect of the present invention, a method of compensating coordinates of an electronic pen in a digitizer includes detecting at least one magnetic field that is produced by the electronic pen and that has a different central axis each other; determining whether the electronic pen is inclined based on a number of detected magnetic fields; and determining by a controller whether to apply a compensation value for compensating coordinates of the electronic pen based on the determination of whether the electronic pen is inclined.

In accordance with another exemplary aspect of the present invention, an apparatus for compensating coordinates of an electronic pen in a digitizer preferably including: a pad on which to detect at least one of the magnetic fields produced by the electronic pen; and a controller that is configured to determine whether or not the electronic pen is inclined based on a number of magnetic fields detected on the pad, and determining whether to apply a compensation value for compensating the coordinates of the electronic pen based on the determination of whether the electronic pen is inclined.

In accordance with another exemplary aspect of the present invention, an electronic pen comprises: a first resonator for receiving a magnetic field produced by a digitizer and producing a first magnetic field having the same central axis as that of the electronic pen; and N resonators for producing N magnetic fields having central axes at predetermined angles from the central axis of the first magnetic field, N being an integer quantity of two or more.

BRIEF DESCRIPTION OF THE DRAWINGS

The above and other features and advantages of the present invention will become more apparent to a person of ordinary skill in the art by describing in detail exemplary embodiments thereof with reference to the attached drawings in which.

DETAILED DESCRIPTION

Descriptions of well-known constructions and configurations may be omitted from the written description when their inclusion could obscure appreciation by a person of ordinary skill in the art of the subject matter of the present claims.

In an exemplary embodiment, provided is a method enabling accurate recognition of coordinates that a user specifically wants to be input by determining whether or not to compensate coordinates of an electronic pen based on inclination of the electronic pen and based on the aforementioned determining, performing or not performing the coordinate compensation.

In another exemplary embodiment, provided is a method of enabling accurate recognition of coordinates that a user wants to be input by compensating coordinates of an electronic pen that takes into account inclination of the electronic pen.

Additional exemplary embodiments of the present invention will now be described with reference to accompanying drawings.

First, a concept of a coordinate compensation method according to an exemplary embodiment is described with reference to FIGS. 4A, 4B, 4C, 4D and 4E.

Figure 4A:
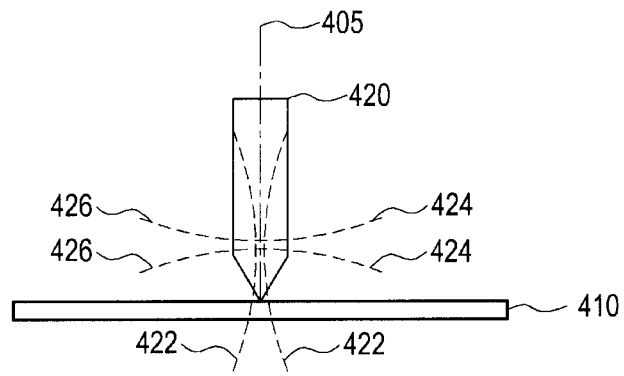
FIGS. 4A, 4B, 4C, 4D and 4E are diagrams illustrating a coordinate compensation method, according to an exemplary embodiment of the present invention.
Figure 4B:
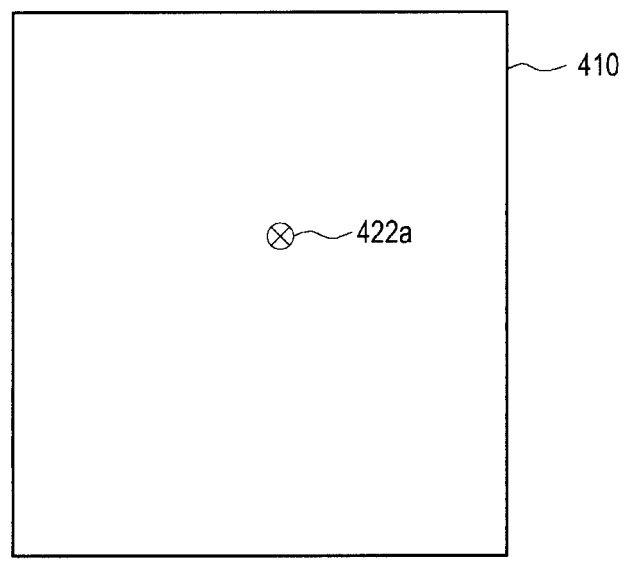
Figure 4C:
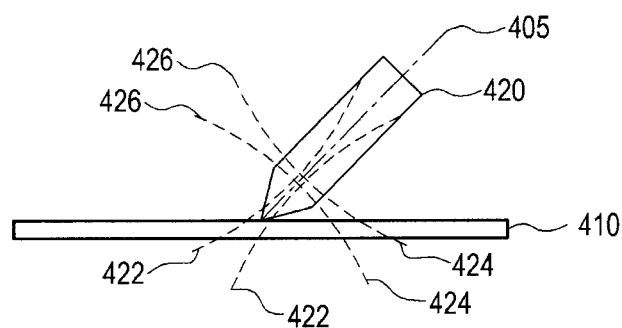

Referring now to FIG. 4A, an electronic pen 420 according to an exemplary embodiment produces a first magnetic field 422 having a first central axis identical to the central axis 405 of the electronic pen 420 and N magnetic fields 424, 426 whose central axes (i.e., second central axis) are perpendicular to the first central axis. Here, N refers to a natural number (integer) equal to or greater than 2, and for purpose of convenience of description, two magnetic fields 424 and 426 are shown in FIGS. 4A and 4C.

A digitizer 410, according to an exemplary embodiment, determines whether not the electronic pen 420 is inclined based on the number of detected magnetic fields, and also determines the inclined direction of the electronic pen 420 based on the number of detected magnetic fields and/or intensities of detected magnetic fields.

Operations of the digitizer 410 will now be described in a case where the electronic pen 420 is perpendicular to the digitizer 410 and in a case where the electronic pen 420 is inclined from the perpendicular position, separately.

As shown in FIG. 4A, in the case the electronic pen 420 is perpendicular to the digitizer 410, the first magnetic field 422 produced from the electronic pen 420 contacts the digitizer 410, whereas the N magnetic fields 424 and 426 do not contact the digitizer 410. Thus, in the digitizer 410, only the first magnetic field 422 is detected at a position 422a, an overhead view as shown in FIG. 4B. Thus, in this example, when only one magnetic field is detected, the digitizer 410 determines that the electronic pen 420 is not inclined with respect to the surface of the digitizer 410, but rather is perpendicular to the surface of the digitizer 410.

If the electronic pen 420 is determined as not being inclined (such as in FIG. 4A), the digitizer 410 determines not to apply a compensation value for coordinate compensation and recognizes the coordinates 422a (seen in FIG. 4B) at which the first magnetic field is detected as input coordinates from the user. In this particular case as the first magnetic field 422 has first central axis of the identical to axis 405 of the electronic pen, the controller determines that no compensation is required to determine accurately the input coordinate of the electronic pen on the surface of the digitizer 410.

Figure 1:
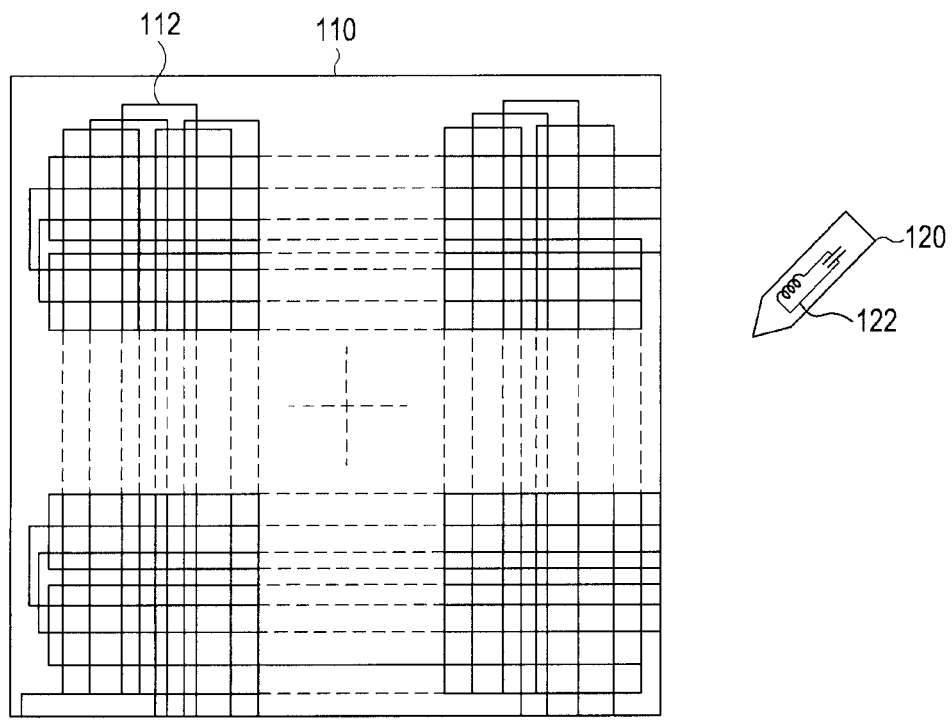
FIG. 1 illustrates a general arrangement of a digitizer.
Figure 2:
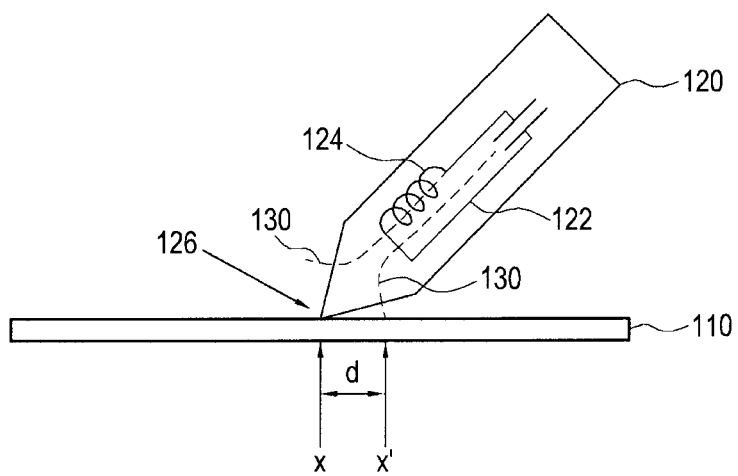
FIG. 2 is a diagram illustrating an error that occurs in inputting coordinates according to a conventional method.
Figure 3A:
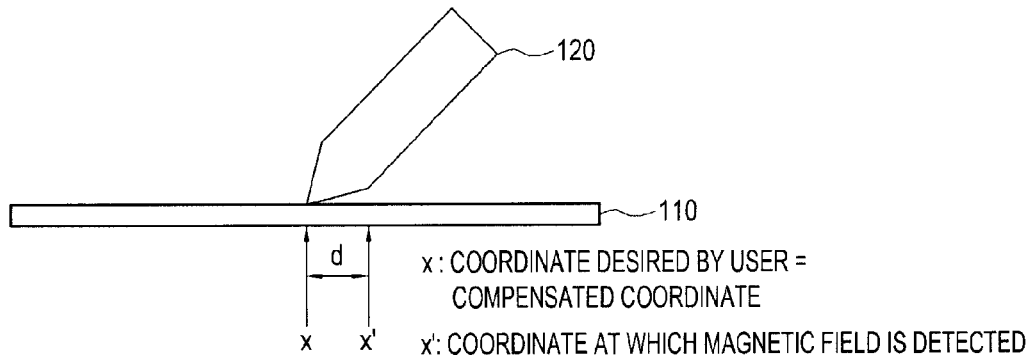
FIGS. 3A, 3B and 3C are respective diagrams illustrating the conventional method for coordinate compensation.
Figure 3B:
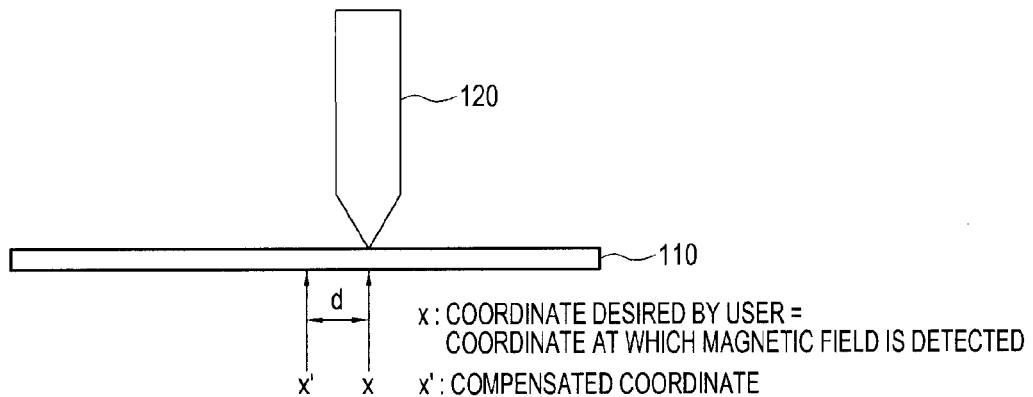

Thus, the present invention has an advantage of solving the problem that arises in the conventional technology, namely as described with aforementioned reference to FIG. 3B, from which rather an error occurs if the compensation value is applied in case the electronic pen 420 is not inclined.

On the other hand, as shown in FIG. 4C, in the case the electronic pen 420 is not perpendicular to the digitizer 420 but is inclined, the first magnetic field 422 and the second magnetic field 424 contact the surface of the digitizer 410.

Figure 4D:
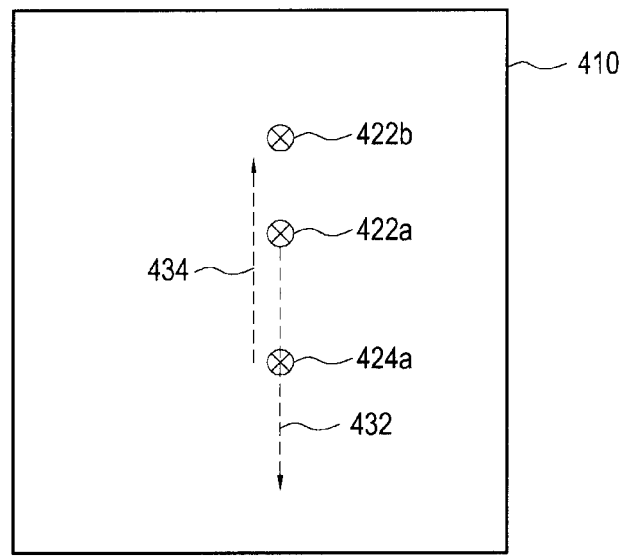

Thus, with reference to FIG. 4D, the digitizer 410 detects the first magnetic field 422 at the position 422a and the second magnetic field 424 at a position 424a. As such, in the case two or more magnetic fields are detected, the digitizer 410 determines that the electronic pen 420 is inclined.

After determining that the electronic pen 420 is inclined, the digitizer 410 determines application of a compensation value for coordinate compensation. Taking into account the inclined direction, the compensation value is applied.

In determining the inclined direction of the electronic pen 420, intensities of the detected magnetic fields may be considered.

For example, if two magnetic fields are detected, as shown in FIG. 4D, the digitizer 410 first determines which one of the positions at which two magnetic fields are detected corresponds to a magnetic field produced around the central axis of the electronic pen 420, i.e., the first magnetic field. In this regard, the digitizer 410 determines the most intense magnetic field to be the first magnetic field 422.

In other words, for example, in the case where the more intense magnetic field is detected at the position 422a from among the positions 422a and 424a where the two magnetic fields are detected, the magnetic field detected at the position 422a is determined to be the first magnetic field. The digitizer then determines that the electronic pen 420 is inclined in the direction 432, and determines coordinates 422b resulting from application of a set compensation value to the coordinates 422a in the direction 434 to be the input coordinates from the user.

In this regard, the first magnetic field 422 is produced more intensely than others from among the magnetic fields (424, 426 shown in FIG. 4C, for example) produced from the electronic pen 420. Related descriptions will be explained later with reference to related figures.

On the other hand, if three or more magnetic fields are produced from the electronic pen 420 and thus three or more magnetic fields are detected by the digitizer 410, the digitizer 410 may determine the inclined direction of the electronic pen 420 taking into account positions at which the three or more magnetic fields are detected based on the position at which the first magnetic field is detected.

Figure 4E:
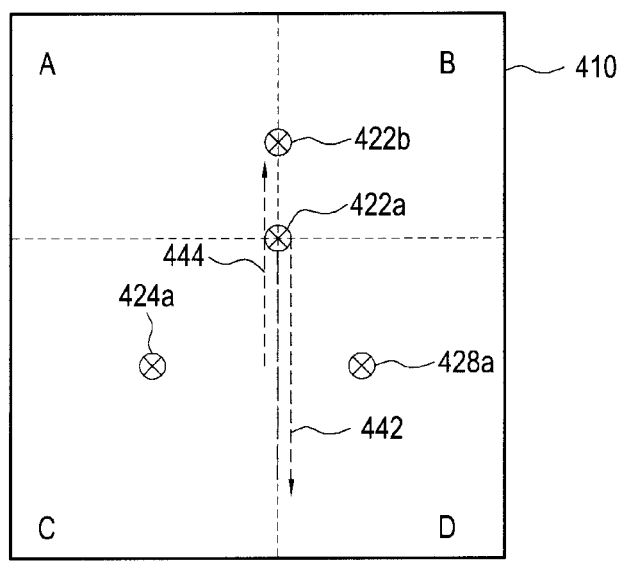

For example, as shown in FIG. 4E, if the digitizer 410 detects three magnetic fields, the digitizer 410 first determines which one of the detected coordinates 422a, 424a, and 428a corresponds to the first magnetic field. Such determination may be made based on intensities of magnetic fields, as mentioned above with reference to FIG. 4D, however, a detailed description of which is omitted herein.

If coordinates at which the first magnetic field is detected are determined to be the coordinates 422a, the digitizer 410 determines which area has the greatest number of detected magnetic fields among a number of detection areas established based on the coordinates 422a at which the first magnetic field is detected. For example, the digitizer 410 determines that the electronic pen 420 is inclined in a detection area in which the greatest number of magnetic fields are detected among four detection areas, upper, lower, left, and right areas with respect to the coordinate 422a at which the first magnetic field is detected, and accordingly performs coordinate compensation with a set compensation value.

For example, referring to FIG. 4E, there are zero coordinates at which an N number of magnetic fields are detected in a first area A and B; one in a second area B and D; two in a third area C and D; and one in a fourth area A and C, the areas A to D being established with respect to the coordinates 422a at which the first magnetic field is detected. Then, the digitizer 410 determines that the electronic pen 420 is inclined in a direction 442 of the third area C and D having the greatest number of coordinates at which magnetic fields are detected, applies the set compensation value to the coordinates 422a in a direction 444, and recognizes coordinates 422b resulting from the compensation with the compensation value as the input coordinate from the user.

Such a method may also be applied to a case only one magnetic field is detected.

Figure 3C:
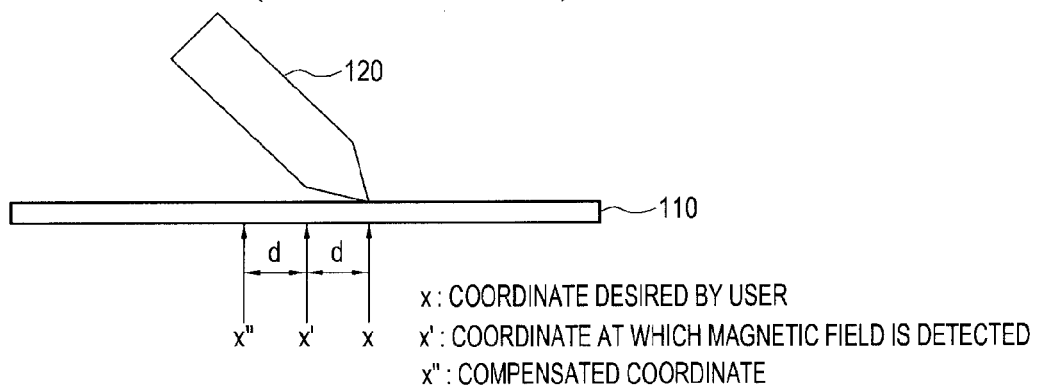

As described above in connection with FIGS. 4A to 4E, the present invention provides an advantage of solving the problem of the conventional technology, as described with reference to FIG. 3C, that an error rather increases depending on the direction of the electronic pen, by performing the coordinate compensation taking into account the inclined direction of the electronic pen.

The concept of the coordinate compensation method according to exemplary embodiments of the present invention has been described above. The coordinate compensation method according to another embodiment will now be described with reference to related figures.

Figure 5:
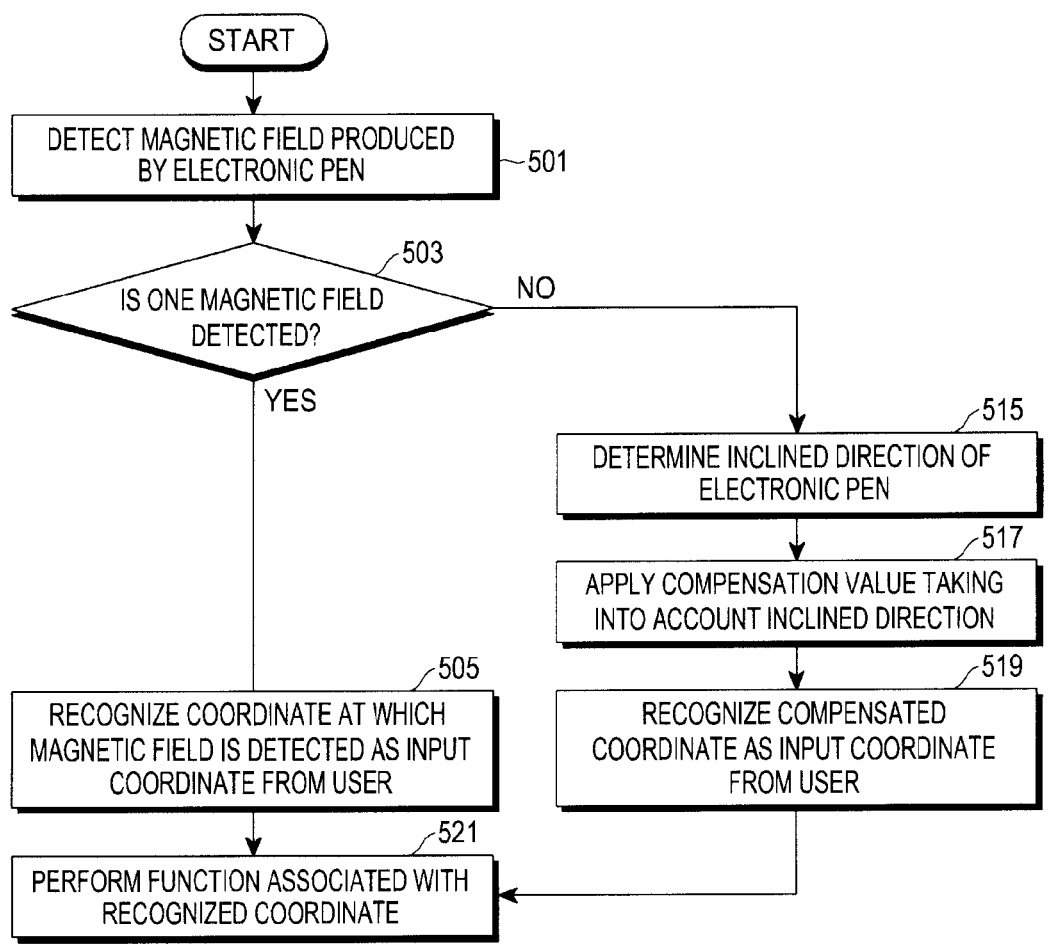
FIG. 5 is a flowchart showing exemplary operation of the coordinate compensation method, according to an exemplary embodiment of the present invention.

FIG. 5 is a flowchart illustrating exemplary operation of the coordinate compensation method, according to the exemplary embodiment of the present invention.

In step 501, the digitizer 410 detects a magnetic field produced by the electronic pen 420.

In step 503, a controller of the digitizer 410 determines how many magnetic fields produced by the electronic pen are detected. If one magnetic field is detected, the digitizer next performs step 505, or else if two or more magnetic fields are detected, the digitizer next performs step 515.

In step 505, because there is only one magnetic field detected, the digitizer 410 recognizes coordinates at which the magnetic field is detected as actual (i.e. accurate) input coordinates from the user, and then next performs step 521. The digitizer 410 does not perform coordinate compensation in step 505 because, in the case one magnetic field is detected, the electronic pen 420 is determined not to be inclined, such as in the example shown in FIG. 4A.

On the other hand, at step 503 in the case where two or more magnetic fields are detected, then at step 515, the digitizer 410, which recognizes that the electronic pen 420 is inclined by the presence of at least a second magnetic field, determines the inclined direction of the electronic pen 420, and then performs step 517.

In step 517, the digitizer 410 applies a set compensation value to coordinates at which the first magnetic field is detected, taking into account the inclined direction of the electronic pen, and then performs step 519. In other words, in step 517, the digitizer 410 applies the set compensation value in the opposite direction to the inclined direction of the electronic pen 420.

In step 519, the digitizer 410 recognizes the coordinates resulting from application of the compensation value as the input coordinate from the user, and then performs step 521.

In step 521, the digitizer 410 performs a function associated with the recognized coordinates. For example, the digitizer 410 generates a specific control signal that corresponds to the recognized coordinates, or generates an output signal at the recognized coordinates.

The coordinate compensation method according to an exemplary embodiment of the present invention was described with reference to FIG. 5. A structure of the electronic pen 420 according to an exemplary embodiment of the present invention will now be described with reference to related figures.

Figure 6A:
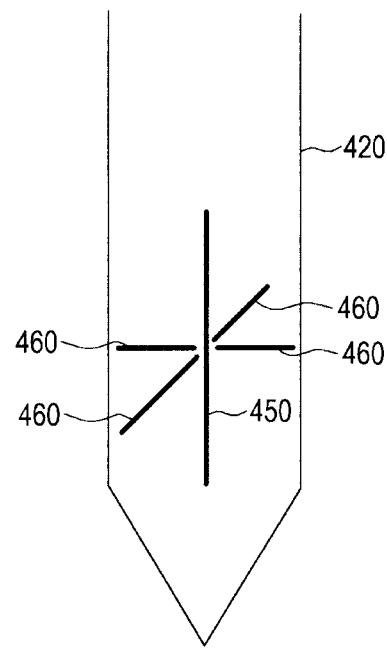
FIGS. 6A, 6B and 6C are diagrams illustrating an electronic pen according to an exemplary embodiment of the present invention.
Figure 6B:
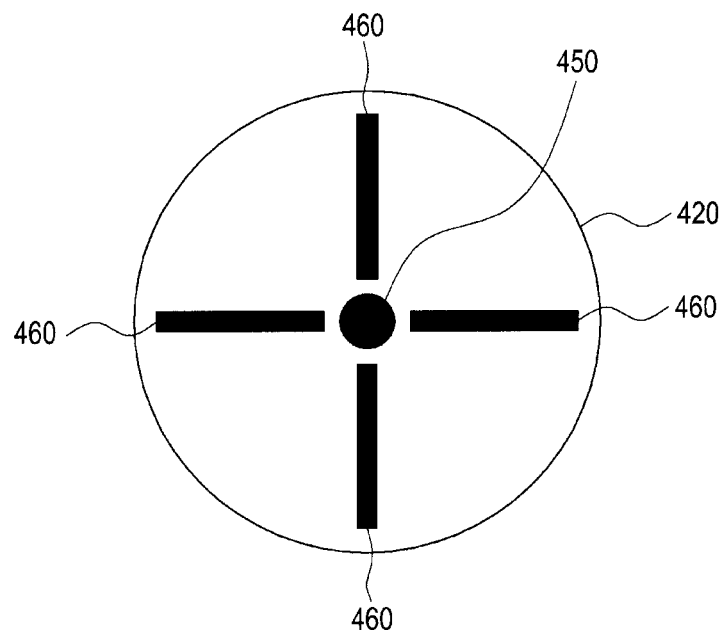
Figure 6C:
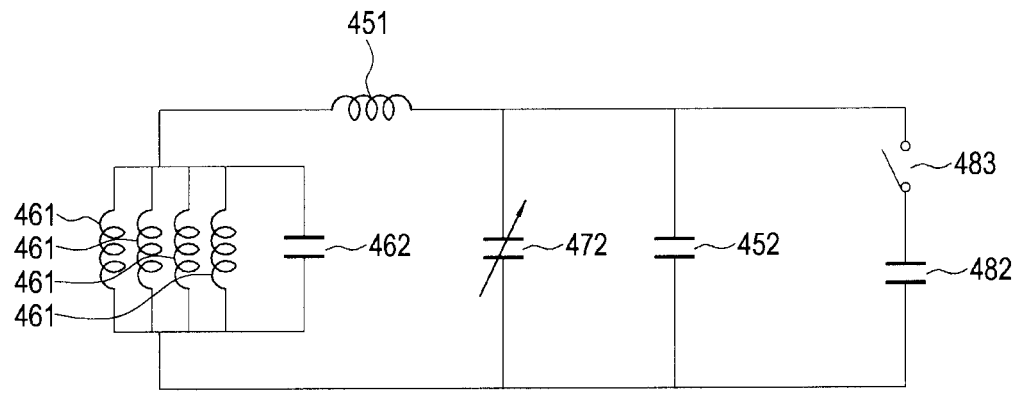

FIG. 6A is a diagram illustrating the electronic pen 420, according to an exemplary embodiment of the present invention; FIG. 6B is a sectional view of the electronic pen 420 shown in FIG. 6A; and FIG. 6C is an equivalent circuit of the electronic pen 420 shown in FIG. 6A.

Referring now to FIG. 6A, the electronic pen 420 includes a first resonator 450 that produces the first magnetic field having a central axis identical to the central axis of the electronic pen 420 and N resonators 460 that produce N magnetic fields having central axes at predetermined angles from the central axis of the first magnetic field.

The first resonator 450 generates an induction current from the magnetic field produced by the digitizer 410, and produces a magnetic field from the induction current. To operate in the aforementioned manner, as shown in FIG. 6C, the first resonator 450 includes a first coil 451 and a first capacitor 452. The magnetic field produced by the digitizer 410 induces an induction current in the first coil 451, and the first capacitor 452 is charged with the induction current. A discharge current from the first capacitor 452 flows back to the first coil 451, around which a magnetic field with a resonant frequency f1 is produced.

The N resonators 460 (FIG. 6B) produce magnetic fields from a current delivered from the first resonator 450. To do this, the N resonators 460 include N coils 461 and N capacitors 462 (FIG. 6C). Discharge currents from the first capacitor 452 and a variable capacitor 472 flow to the first coil 451 and the N coils 461, around which magnetic fields are produced, the magnetic fields having resonant frequencies determined by combinations of N coils 461 and N capacitors 462.

Each of magnetic fields produced by the N resonators 460 is inclined at a predetermined angle with the magnetic field produced by the first resonator 450, and the predetermined angle, in an embodiment, between the central axis of the each of the N magnetic fields and the central axis of the first magnetic field is 90 degrees. The N magnetic fields may keep the same angle from each other. Meanwhile, the N resonators 460 may be arranged higher above the first resonator 450. The reason that N resonators 460 may be arranged higher above the first resonator 450 is to reduce errors in the digitizer 410 determining a position at which the first magnetic field is detected, in the case where the electronic pen 420 is inclined too much (beyond a predetermined inclination value. In the meantime, the current flown to each of the N resonators 460 is 1/N of the discharge current from the first resonator 450, and then the intensity of the magnetic field produced by each of the N resonators 460 is 1/N of the intensity of the magnetic field produced by the first resonator 450. Thus, as described above, the digitizer 410 may identify the position at which the first magnetic field is detected based on the intensities of magnetic fields.

Although not shown in FIGS. 6A and 6B, the capacitor 472 shown in FIG. 6C, which is a variable capacitor, is used to adjust the resonant frequency, and a capacitor 482 and a switch 483 are used to temporarily change the resonant frequency in order to perform a particular function.

In the foregoing, the structure of the electronic pen 420 according to an exemplary embodiment of the present invention was examined with reference to FIGS. 6A, 6B and 6C. The digitizer 410 according to an exemplary embodiment of the present invention will now be described with reference to a related figure.

Figure 7:
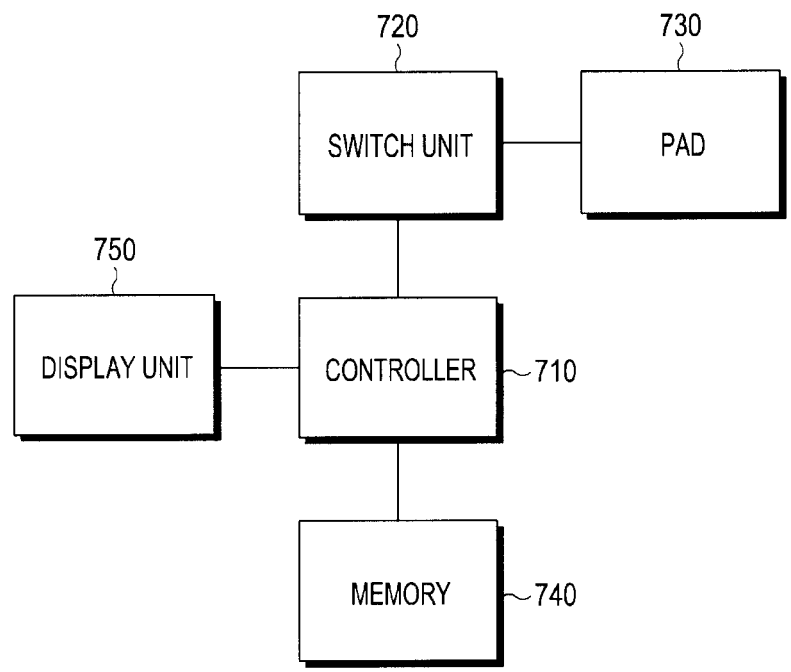
FIG. 7 is a block diagram of a digitizer, according to an exemplary embodiment of the present invention.

FIG. 7 is a block diagram of the digitizer 410, according to an exemplary embodiment of the present invention.

Referring to FIG. 7, the digitizer 410 includes a controller 710, a switch unit 720, a pad 730, a memory 740, and a display unit 750.

The controller 710, which comprises hardware such as a processor or microprocessor, is configured to control the switch unit 720 such that a plurality of loop patterns formed on the pad 730 may be sequentially selected. Each time one loop pattern is selected, the controller 710 repeats application and termination of the current so that generation and detection of the magnetic field take turns being performed.

The controller 710 is also configured to determine whether the electronic pen 420 is inclined based on the number of magnetic fields detected by the pad 730, and accordingly determines whether to apply a compensation value for compensating the coordinates of the electronic pen 420.

In this example, the controller 710 determines, when only one magnetic field is detected, that the electronic pen 420 is not inclined, and then determines not to apply the compensation value. On the other hand, when a plurality of magnetic fields are detected, the controller 710 determines that the electronic pen 420 is inclined and then applies the compensation value, preferably according to a direction of the incline, such as in FIG. 4C, or even in an inclination such as shown in FIG. 3C.

In the case of applying the compensation value, the controller 710 determines the inclined direction of the electronic pen 420 based on coordinates and intensities of detected magnetic fields, and compensates the coordinate of the electronic pen 420 with the compensation value in the opposite direction to the inclined direction of the electronic pen 420. Here, the controller 710 determines that the electronic pen 420 is inclined in a direction of an area in which there are the greatest number of coordinates at which magnetic fields are detected except for the most intense magnetic field among a number of detection areas established based on the coordinates at which the most intense magnetic field is detected.

The switch unit 720 sequentially selects the plurality of loop patterns formed on the pad 730, under control of the controller 710. The switch unit 720 is comprised of hardware configured for operation and optionally include a power supply for applying the current to the pad 730.

The pad 730 has the plurality of loop patterns formed orthogonally to one another. The plurality of loop patterns are sequentially selected under control of the controller 710, and generation and detection of magnetic fields take turns being performed for the selected loop pattern.

For example, when any one of loop patterns are selected, a current is applied to the selected loop pattern, from which a magnetic field is produced and then delivered to the electronic pen 420. After application of the current to the selected loop pattern for a predetermined time period, detection of the magnetic field produced by the electronic pen 420 is performed for the selected loop pattern.

The memory 740, which is a non-transitory machine readable medium stores information for the coordinate compensation. For example, in determining the inclined direction of the electronic pen 420, information about how many detection areas to be divided based on the coordinates at which the first magnetic field is detected may be stored. If the electronic pen 420 is determined to be inclined, information about how much compensation value is to be applied may be stored.

The display unit 750 which includes hardware such as a display screen displays the coordinates recognized by the controller 710.

The present invention has an advantage of enabling exact recognition of coordinates of the electronic pen by performing the coordinate compensation taking into account the inclination of the electronic pen and the inclined direction.

The above-described methods according to the present invention can be implemented in hardware, firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101 and none of the elements consist of software per se.

The terms "unit" or "module" as may be used herein is to be understood as constituting hardware such as a processor or microprocessor configured for a certain desired functionality in accordance with statutory subject matter under 35 U.S.C. §101 and does not constitute software per se.

The foregoing exemplary embodiments may be implemented in many different methods that are within the spirit and scope of the claimed invention. The exemplary embodiments disclosed herein may be implemented in hardware, or machine executable code that is loaded into hardware for execution, or a combination thereof. Implemented in machine executable code, the exemplary embodiment is executed by hardware such as one or more processors or microprocessors with various operating systems or platforms. Additionally, the machine executable code can be written in any of plurality of styles, languages, of formats, and/or may be compiled into machine-executable assembly language codes or intermediate codes, which are executed by hardware.

Furthermore, the exemplary embodiments can be implemented on non-transitory machine readable mediums, such as, for example, non-transitory electronic memories, floppy discs, hard discs, compact discs, optical discs, or magnetic tapes, thumbnail drives, just to name a few non-limiting examples.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method of compensating coordinates of an electronic pen in a digitizer, the method comprising:
   detecting, by a pad of the digitizer, a first magnetic field being produced by the electronic pen that contacts the pad of the digitizer;
   determining, by a controller, if only the first magnetic field produced by the electronic pen is detected by the pad of the digitizer, that the electronic pen is substantially perpendicular relative to a surface of the pad and is not inclined relative to the surface of the pad;
   detecting, by the pad of the digitizer, at least one second magnetic field being produced by the electronic pen that contacts the pad of the digitizer, wherein the at least one second magnetic field is detected based on coordinates of the detected first magnetic field and has a different central axis from the first magnetic field;
   determining, by the controller, when the first magnetic field and the at least one second magnetic field is detected by the pad of the digitizer, that the electronic pen is inclined relative to the surface of the pad; and
   detecting by the pad of the digitizer, magnetic fields from among four detection areas with respect to a coordinate at which the first magnetic field is detected, and identifying one of the four detection areas as having a greatest number of magnetic fields as a detection area in which the electronic pen is inclined; and
   applying, by the controller, a stored compensation value to the coordinates of the detected first magnetic field based on an incline direction of the electronic pen, if the electronic pen is inclined relative to the surface of the pad of the digitizer.

2. The method of claim 1, further comprising:
   determining, by the controller, a direction in which the electronic pen is inclined relative to the surface of the pad including intensities of the detected magnetic fields; and
   compensating, by the controller, the coordinates of the electronic pen with the compensation value in an opposite direction to the direction in which the electronic pen is inclined.

3. The method of claim 2, further comprising:
   displaying, by a display screen, the compensated coordinates of the electronic pen.

4. The method of claim 1, wherein the magnetic fields produced by the electronic pen produces:
   the first magnetic field produced along a central axis of the electronic pen; and
   the at least one second magnetic field produced at predetermined angles from the central axis of the electronic pen.

5. The method of claim 4, wherein the at least one second magnetic field are produced at a higher position relative to the first magnetic field.

6. An apparatus for compensating coordinates of an electronic pen in a digitizer, the apparatus comprising:
   a pad of the digitizer for detecting contact by one or more magnetic fields being produced by the electronic pen; and
   a controller configured to:
   determine that the electronic pen is substantially perpendicular relative to a surface of the pad if only a first magnetic field produced by the electronic pen is detected by the pad of the digitizer,
   determine that the electronic pen is inclined relative to the surface of the pad of the digitizer when the first magnetic field and at least one second magnetic field are detected by the pad of the digitizer based on detection that, by the pad of the digitizer, magnetic fields from among four detection areas with respect to a coordinate at which the first magnetic field is detected, and identify one of the four detection areas as having a greatest number of magnetic fields as a detection area in which the electronic pen is inclined, and apply a stored compensation value to coordinates of the detected first magnetic field based on an inclined direction of the electronic pen, if the electronic pen is inclined relative to a surface of the pad of the digitizer, wherein the at least one second magnetic field is detected based on the coordinates of the detected first magnetic field and has a different central axis from the first magnetic field.

7. The apparatus of claim 6, wherein the controller determines, if only the first magnetic field is detected, that application of a compensation value is not required to calculate coordinates of the electronic pen.

8. The apparatus of claim 6, wherein the controller determines a direction in which the electronic pen is inclined relative to the surface of the pad is based on coordinates and intensities of the detected magnetic fields, and compensates the coordinates of the electronic pen with the compensation value in the opposite direction to the direction in which the electronic pen is inclined relative to the surface of the pad.

9. The apparatus of claim 8, further comprising a display unit for displaying the coordinates of the electronic pen, and wherein the controller controls the display unit to display the compensated coordinates of the electronic pen.

10. The apparatus of claim 6, wherein the at least one magnetic field that is produced by the electronic pen includes:

the first magnetic field produced along a central axis of the electronic pen; and the at least one second magnetic field produced at predetermined angles from the central axis of the electronic pen.

11. The apparatus of claim 10, wherein the at least one second magnetic field is produced at a higher position relative to the first magnetic field.

\* \* \* \* \*